United States Patent
Huang

(10) Patent No.: US 12,008,245 B2
(45) Date of Patent: Jun. 11, 2024

(54) METHOD AND DEVICE FOR HOT SWAPPING MEMORY, AND MEMORY

(71) Applicant: CHANGXIN MEMORY TECHNOLOGIES, INC., Hefei (CN)

(72) Inventor: Guowei Huang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 17 days.

(21) Appl. No.: 17/821,760

(22) Filed: Aug. 23, 2022

(65) Prior Publication Data

US 2023/0376213 A1 Nov. 23, 2023

Related U.S. Application Data

(63) Continuation of application No. PCT/CN2022/099681, filed on Jun. 20, 2022.

(30) Foreign Application Priority Data

May 18, 2022 (CN) .......................... 202210550689.X

(51) Int. Cl.
G06F 12/00 (2006.01)
G06F 3/06 (2006.01)

(52) U.S. Cl.
CPC .......... *G06F 3/0619* (2013.01); *G06F 3/0647* (2013.01); *G06F 3/0673* (2013.01)

(58) Field of Classification Search
CPC ..... G06F 3/0619; G06F 3/0647; G06F 3/0673
See application file for complete search history.

(56) References Cited

U.S. PATENT DOCUMENTS

| 5,859,960 | A | * | 1/1999 | Kurihara | G11C 29/765 |
| | | | | | 714/6.32 |
| 6,038,680 | A | | 3/2000 | Olarig | |
| 6,959,370 | B2 | | 10/2005 | Shaw | |
| 7,350,089 | B2 | | 3/2008 | Mundada | |
| 9,632,888 | B2 | | 4/2017 | Sun | |

(Continued)

FOREIGN PATENT DOCUMENTS

| CN | 202615294 U | 12/2012 |
| CN | 103019978 A | 4/2013 |

(Continued)

OTHER PUBLICATIONS

First Office Action of the Chinese application No. 202210550689.X, issued on Jun. 26, 2023. 8 pages with English abstract.

(Continued)

*Primary Examiner* — Shawn X Gu
*Assistant Examiner* — Mohammad S Hasan
(74) *Attorney, Agent, or Firm* — Syncoda LLC; Feng Ma

(57) ABSTRACT

A method for hot swapping a memory includes the following: in response to a triggering operation of a replacement key of an abnormal memory, data on the abnormal memory is copied to an idle memory when a system is powered on; and the abnormal memory is powered off and replaced with a new memory after the data is copied; and in response to the triggering operation of a power on key of the new memory, the new memory is powered on. A method for hot swapping a memory in the case where a system is not powered off is provided.

7 Claims, 9 Drawing Sheets

(56) References Cited

U.S. PATENT DOCUMENTS

| | | | |
|---|---|---|---|
| 9,904,627 B2 * | 2/2018 | Metzler | G06F 12/1009 |
| 10,268,612 B1 * | 4/2019 | Bshara | G06F 3/061 |
| 11,012,548 B1 * | 5/2021 | Zhang | G06F 3/1454 |
| 11,226,757 B2 | 1/2022 | Jiang | |
| 11,620,233 B1 * | 4/2023 | Habusha | G06F 12/0891 |
| | | | 711/207 |
| 2001/0042228 A1 | 11/2001 | Klein | |
| 2002/0129186 A1 | 9/2002 | Emerson | |
| 2004/0133756 A1 | 7/2004 | Shaw | |
| 2004/0143695 A1 * | 7/2004 | Hashimoto | F02D 41/2496 |
| | | | 711/1 |
| 2006/0294414 A1 | 12/2006 | Mundada | |
| 2007/0234112 A1 * | 10/2007 | Thayer | G11C 29/76 |
| | | | 714/6.13 |
| 2010/0004811 A1 * | 1/2010 | Kannan | G07C 5/085 |
| | | | 701/36 |
| 2010/0122592 A1 * | 5/2010 | Kim | H04Q 9/00 |
| | | | 73/865.8 |
| 2012/0191900 A1 | 7/2012 | Kunimatsu | |
| 2015/0067223 A1 | 3/2015 | Xiao | |
| 2015/0242154 A1 * | 8/2015 | Yang | G06F 11/1658 |
| | | | 711/115 |
| 2015/0363309 A1 * | 12/2015 | Lai | G11C 29/44 |
| | | | 711/103 |
| 2016/0179643 A1 * | 6/2016 | Sun | G06F 11/1461 |
| | | | 711/115 |
| 2017/0031399 A1 * | 2/2017 | Yang | G06F 1/26 |
| 2019/0199388 A1 * | 6/2019 | Cunningham | G06F 1/1633 |
| 2021/0311900 A1 * | 10/2021 | Malladi | G06F 12/1045 |
| 2021/0397353 A1 * | 12/2021 | Breitbart | G06F 11/1666 |
| 2023/0011582 A1 * | 1/2023 | Kim | G11C 5/147 |

FOREIGN PATENT DOCUMENTS

| | | |
|---|---|---|
| CN | 103198028 A | 7/2013 |
| CN | 103842968 A | 6/2014 |
| CN | 105353980 A | 2/2016 |
| CN | 106133704 A | 11/2016 |
| CN | 107066936 A | 8/2017 |
| CN | 108334466 A | 7/2018 |
| CN | 109302188 A | 2/2019 |
| CN | 110347531 A | 10/2019 |
| CN | 110580195 A | 12/2019 |
| TW | I226572 B | 1/2005 |
| TW | I450184 B | 8/2014 |
| TW | I575374 B | 3/2017 |

OTHER PUBLICATIONS

First Office Action of the Taiwanese application No. 111134490, issued on May 29, 2023. 9 pages with English abstract.

International Search Report in the international application No. PCT/CN2022/099681, mailed on Feb. 8, 2023.

Supplementary European Search Report in the European application No. 22760642.3, mailed on Jan. 31, 2024, 12 pages.

* cited by examiner

METHOD AND DEVICE FOR HOT SWAPPING MEMORY, AND MEMORY

CROSS-REFERENCE TO RELATED APPLICATIONS

This application is a continuation application of International Application No. PCT/CN2022/099681 filed on Jun. 20, 2022, which claims priority to Chinese Patent Application No. 202210550689.X filed on May 18, 2022. The disclosures of the above-referenced applications are hereby incorporated by reference in their entirety.

BACKGROUND

Dual-inline-memory-modules (DIMM) provide 64-bit data channels and are widely used.

In general, hot swapping cannot be performed in practical applications of memories. Once a memory is abnormal, the replacement of the memory must be performed when a system is powered off.

However, a power off process of the system takes a long time, so that it is extremely inconvenient to replace the memory.

SUMMARY

The disclosure relates to the technical field of integrated circuits, and particularly, to a method for hot swapping a memory, a device for hot swapping a memory, and a memory.

According to the first aspect of the disclosure, a method for hot swapping a memory is provided, which includes that: in response to a triggering operation of a replacement key of an abnormal memory, data on an abnormal memory is copied to an idle memory when a system is in a powered on state; the abnormal memory is powered off and replaced with a new memory after the data is copied; and in response to a triggering operation of a power on key of the new memory, the new memory is powered on.

According to the second aspect of the disclosure, a device for hot swapping a memory is provided, which includes: a data copying module configured to, in response to a triggering operation of a replacement key of an abnormal memory, copy data on the abnormal memory to an idle memory when a system is powered on; a power off module configured to power off the abnormal memory and replace the abnormal memory with a new memory after the data is copied; and a power on module configured to, in response to a triggering operation of a power on key of the new memory, power on the new memory.

According to the third aspect of the disclosure, a memory is provided, which includes: a memory body, and a replacement key and a power on key arranged on the memory body. The replacement key and the power on key are separately connected to a hub through an input/output interface. The hub is configured to send a system management bus signal to a central processing unit (CPU) when level conversion occurs at the input/output interface. The CPU is configured to power on or power off the memory after receiving the system management bus signal.

DETAILED DESCRIPTION

Figure 1:
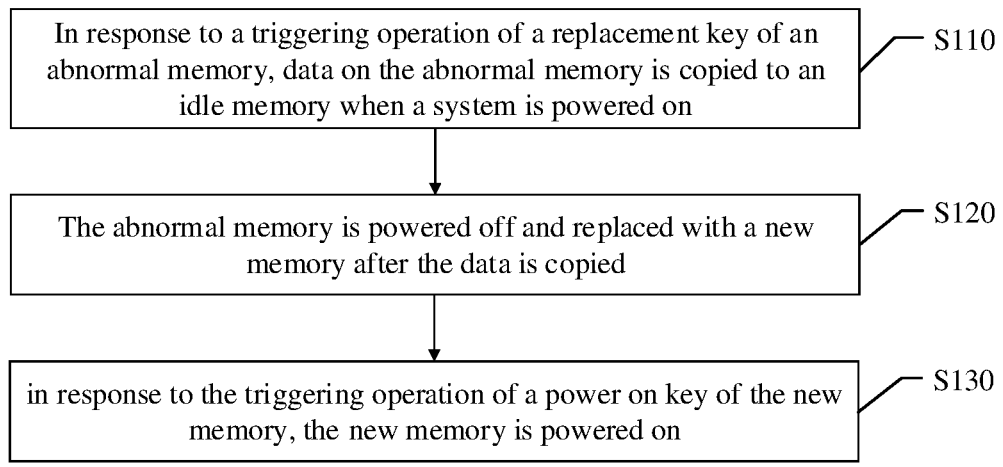
FIG. 1 schematically illustrates a flowchart of a method for hot swapping a memory according to an exemplary implementation mode of the disclosure.

Exemplary implementation modes will now be described more comprehensively with reference to the accompanying drawings. However, the exemplary implementation modes can be implemented in a variety of forms and should not be construed as being limited to the examples set forth herein. Instead, these implementation modes are provided, so that the disclosure will be more comprehensive and complete, and the concepts of the exemplary implementation modes are fully conveyed to those skilled in the art. The described features, structures, or characteristics may be combined in one or more implementation modes in any suitable mode. In the following description, numerous specific details are provided for fully understanding the implementation modes of the present disclosure. However, those skilled in art will appreciate that the technical solution of the disclosure may be practiced while omitting one or more of the specific details, or other methods, components, apparatuses, steps, etc. may be employed. In other cases, the well-known technical solutions are not shown or described in detail, so as to avoid obscuring various aspects of the disclosure.

In addition, the accompanying drawings are merely schematic illustrations of the disclosure and are not necessarily drawn to scale. The same reference numerals in the drawings denote the same or similar parts, so repeated description thereof will be omitted. Some block diagrams shown in the drawings are functional entities and do not necessarily to correspond to physically or logically separate entities. These functional entities may be implemented in form of software, or these functional entities may be implemented in one or more hardware modules or integrated circuits, or these functional entities are implemented in different networks and/or processor apparatuses and/or micro-controller apparatuses.

The flowcharts shown in the drawings are merely exemplary descriptions and do not necessarily include all of the operations. For example, some of the operations may be divided and some of the steps may be combined or partially combined, so that the order of actual execution may vary depending on actual situations. In addition, all the following terms "first", "second" and "third" are for the purpose of distinction only and should not be used as a limitation of the disclosure.

DDR4 is the abbreviation of the fourth generation DDR SDRAM, DDR5 is the abbreviation of the fifth generation DDR SDRAM, DDR SDRAM is the abbreviation of Double Data Rate SDRAM in English, and SDRAM is the abbreviation of Synchronous Dynamic Random Access Memory. The synchronization object is a system clock frequency. Therefore, in combination, DDR4 is the fourth generation double rate synchronous dynamic random access memory, and DDR5 is the fifth generation double rate synchronous dynamic random access memory. From DDR4 to DDR5, a power supply unit of a DIMM memory has been moved from a mainboard to the DIMM memory. The power supply on each DIMM memory is independent. Therefore, each DIMM memory may be powered on and powered off independently.

On this basis, the embodiments of the disclosure provide a method for hot swapping a memory, which is applied to a memory that can supply power to a memory module, such as DDR5, independently, thus can replace an abnormal memory without shutting down a system, so as to realize a hot-swap mode of the memory. Referring to FIG. 1, the method for hot swapping a memory may include the following operations.

At S110, in response to a triggering operation of a replacement key of an abnormal memory, data on the abnormal memory is copied to an idle memory when a system is powered on.

At S120, the abnormal memory is powered off and replaced with a new memory after the data is copied.

At S130, in response to a triggering operation of a power on key of the new memory, the new memory is powered on.

According to the method for hot swapping a memory provided by exemplary implementation mode of the disclosure, the data on the abnormal memory may be copied to an idle memory first in response to the triggering operation of the replacement key of the abnormal memory when the system is in a working state, and only the abnormal memory is powered off after the data is copied; then, the abnormal memory may be replaced with a new memory; and the new memory may be powered on in response to the triggering operation of the power on key of the new memory. The whole process described above may realize an abnormal memory replacement process when the system is in the working state, that is, a method for hot swapping a memory.

The abovementioned method for hot swapping the memory is specifically described below in combination with a specific operation process.

At S110, the data on the abnormal memory is copied to the idle memory in response to the triggering operation of the replacement key of the abnormal memory when the system is powered on.

In an exemplary implementation mode of the disclosure, the system may include a computer system or a server system, which is a machine system that receives and stores information according to human requirements, automatically performs data processing and calculation, and outputs result information.

The system usually needs to store data. Therefore, the system also includes a memory. During working, data may be read from the memory or may be stored in the memory.

In an exemplary implementation mode of the disclosure, the system in a powered on state may be that the system is in a startup state, or the system is in a working state, for example, a state that the system is performing a data access operation and the like. Here, the system in the powered on state may be understood that the system is not in a shutdown state, and the system does not need to be shut down during the whole swapping process of the memory.

In actual applications, the abnormal memory may be a memory with a data reading error, that is, abnormal data are found in the abnormal memory. A physical address of the abnormal memory is determined according to the logical address of abnormal data after the abnormal data is found.

Figure 2:
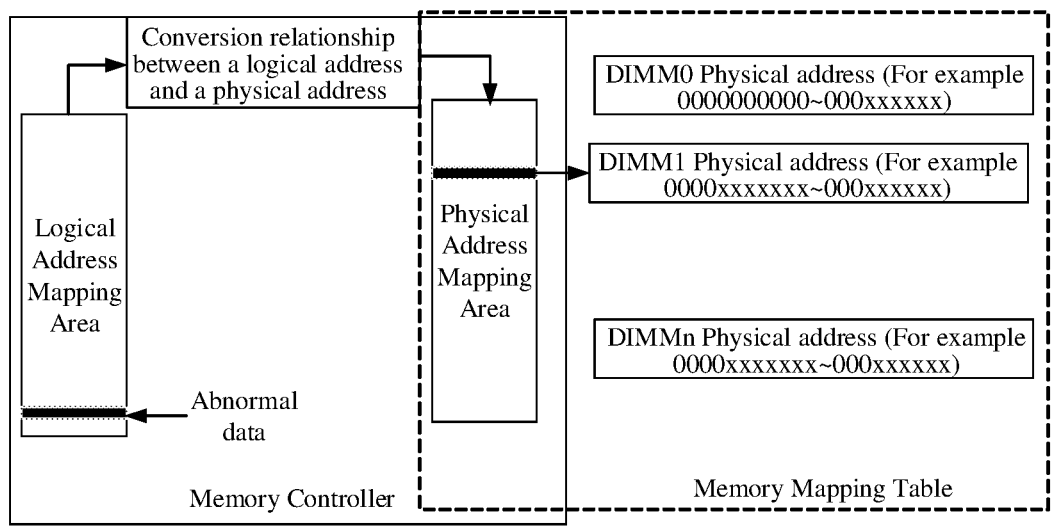
FIG. 2 schematically illustrates a flowchart of determining an abnormal memory from abnormal data according to the exemplary implementation mode of the disclosure.

Reference is made to FIG. 2, which illustrates a flowchart of determining an abnormal memory from abnormal data. As shown in FIG. 2, when a memory controller (MC) finds that there is abnormal data in memory data, the MC may acquire the logical address of the abnormal data from a logical address mapping area, and the MC then coverts the logical address of the abnormal data into a physical address of the abnormal memory according to a conversion relationship between the logical address and the physical address, so that a corresponding DIMM memory may be found according to the physical address. In FIG. 2, a physical address mapping area in the MC corresponds to a memory physical address in a memory mapping table. A specific abnormal memory may be determined from the physical address in the physical address mapping area.

In an exemplary implementation mode of the disclosure, the replacement key may be a physical key arranged on the abnormal memory or a virtual key added on a baseboard management controller (BMC) interface. The replacement key is connected to the CPU of the system through a hub, and thus informs the CPU or the MC through a system management bus (Smbus) or an improved inter integrated circuit (I3C) signal, that the corresponding memory needs to be powered off and replaced.

When a user wants to replace the abnormal memory and after the replacement key is pressed, according to the method for hot swapping the memory provided by the embodiments of the disclosure, first, the data in the abnormal memory may be copied to an idle memory in response to a triggering operation of the replacement key, so as to save the data in the abnormal memory. The triggering operation of the replacement key may be a single-click operation, a double-click operation, a long press operation, or other triggering operations. There are no special limits made to specific forms of the triggering operations in the exemplary implementation mode of the disclosure.

Figure 3:
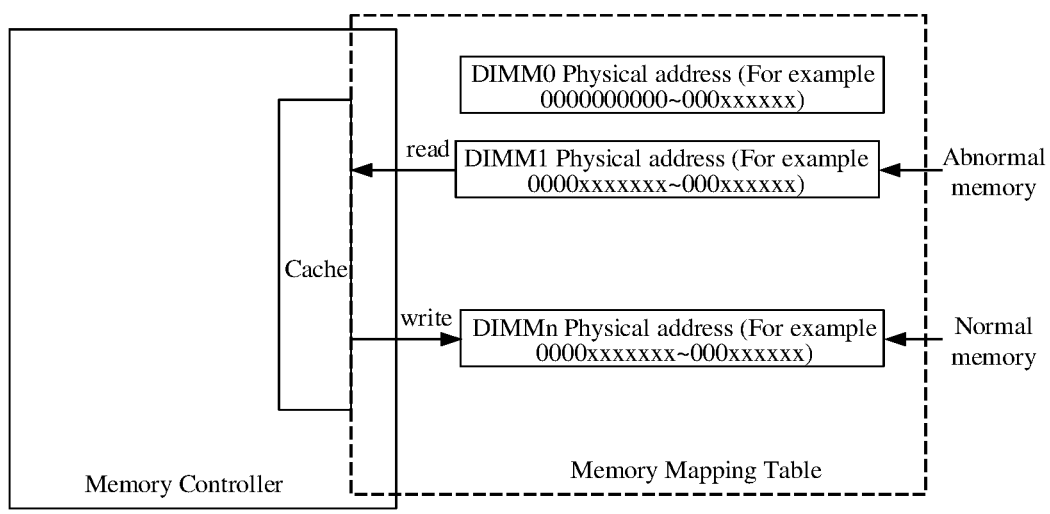
FIG. 3 schematically illustrates a flowchart of copying data on the abnormal memory according to the exemplary implementation mode of the disclosure.

In an exemplary implementation mode of the disclosure, reference is made to FIG. 3 which illustrates a flowchart of copying data of the abnormal memory. During copying the data of the abnormal memory, firstly, a writing operation on the abnormal memory needs to be stopped first, and new data is not written into the abnormal memory any longer, so as to prevent data loss. Secondly, the data in the abnormal memory may be read through a reading operation, and the read data may be stored in a cache that can temporarily store the data. Finally, the data in the cache may be written into an idle memory other than the abnormal memory. The idle memory here may be a normal memory that stores some data or a normal memory that does not store any data.

It is to be noted that the abovementioned data copying process of the abnormal memory may be executed by an MC.

At S120, the abnormal memory is powered off after the data is copied, and the abnormal memory is replaced with a new memory.

In an exemplary implementation mode of the disclosure, after the data in the abnormal memory is copied to the idle memory, the abnormal memory is powered off. A specific powering off operation may be that the abnormal memory is powered off by pulling down a power management IC enable signal corresponding to the abnormal memory after the CPU or the MC receives the Smbus or the I3C signal. The power management IC enable signal is an enable signal when the power management IC (PMIC) works.

In actual applications, whether the abnormal memory has been powered off may also be indicated by an indicating lamp. For example, the replacement key is set as a key with a double-color indicating lamp. After the replacement key is pressed down, the color of the indicating lamp changes, which indicates that abnormal memory has been powered off.

After the abnormal memory is powered off, the abnormal memory may be replaced with a new memory. This process may be operated manually.

In an exemplary implementation mode of the disclosure, after the abnormal memory is powered off, the record of the abnormal memory further needs to be removed from the memory mapping table of the system, so that the system does not record the abnormal memory any longer. The memory mapping table is a record table that stores the physical addresses of memories. The abnormal memory record usually needs to be removed from the memory mapping table, so that the system can acquire the physical address of a normal memory from the memory mapping table.

At S130, the new memory is powered on in response to the triggering operation of the power on key of the new memory.

In an exemplary embodiment of the disclosure, a newly inserted memory needs a triggering operation after the abnormal memory is replaced with the new memory. The triggering operation may be a single-click operation, a double-click operation, a long press operation, or other triggering operations. There are no special limits made to specific forms of the triggering operation in the exemplary embodiment of the disclosure.

In response to the triggering operation of the power on key of the new memory, the power on key may inform the CPU or the MC to perform power-on initialization of the new memory.

In an exemplary implementation mode of the disclosure, the power on key may be a physical key arranged on the new memory or a virtual key added on the BMC interface. The power on key is connected to the CPU or the MC of the system through a hub, and informs the CPU or the MC by a Smbus or an I3C signal that the corresponding memory needs to power on.

A specific powering on operation may be that the new memory is powered on by pulling up a power management IC enable signal corresponding to the new memory after the CPU or the MC receives the Smbus or the I3C signal. The power management IC enable signal is an enable signal when a Power Management IC (PMIC) works.

In actual applications, whether a new memory has been powered on may also be indicated by an indicating lamp. For example, the power on key is set as a key with a double-color indicating lamp. After the power on key is pressed down, the color of the indicating lamp changes, so as to indicate that the new memory has been powered off.

In actual applications, after the new memory is powered on, the system also needs to initialize and adjust the new memory to have an optimal state. After that, the system may record the new memory to the memory mapping table of the system for normal use of the system. The initialization and adjustment of the new memory belong to conventional technical means, which will not be elaborated herein.

According to the method for hot swapping the memory provided by an exemplary implementation mode of the disclosure, an abnormal memory may be powered off and replaced with a new memory after the data on the abnormal memory is copied to an idle memory in response to a triggering operation of a replacement key of the abnormal memory when the system is in a powered on state. That is, it is unnecessary to shut down the system in the replacement process of the abnormal memory, and there is no time spent for shutting down the system in the replacement process, so that the time consumption for replacing the abnormal memory can be reduced. It is convenience for a user with implementation of the hot swap mode for an abnormal memory when the system is powered on or in a working state.

Figure 4:
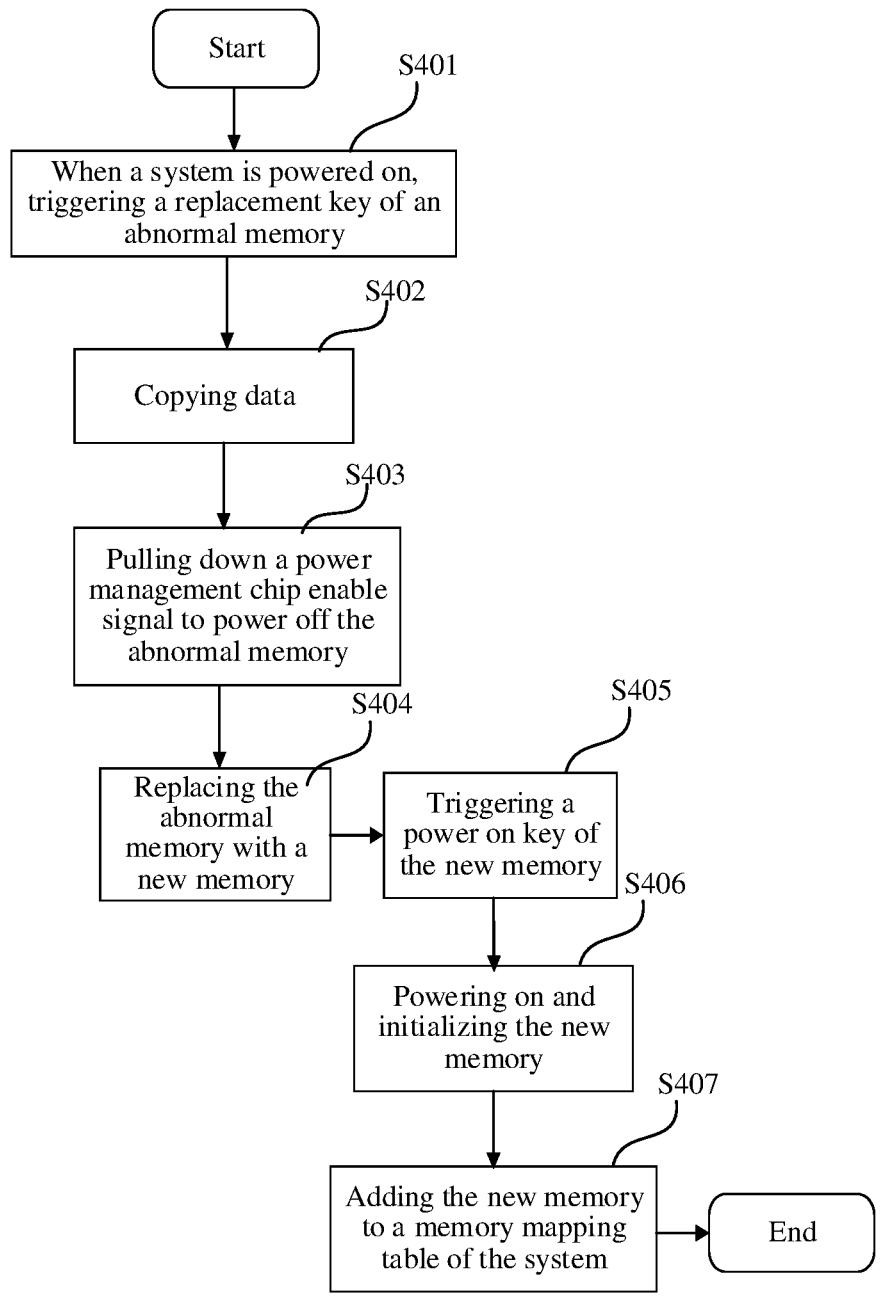
FIG. 4 schematically shows a flowchart of operations of method for hot swapping a memory according to an exemplary implementation mode of the disclosure.

FIG. 4 illustrates a flowchart of operations of the method for hot swapping the memory provided by an exemplary implementation mode of the disclosure. As shown in FIG. 4, first, S401 is entered. When a system is powered on, a replacement key of an abnormal memory is triggered. S402, data on the abnormal memory is copied to an idle memory in response to the triggering operation of the replacement key of the abnormal memory, referred to as data copying for short. S403, a power management IC enable signal is pulled down to power off the abnormal memory after the data is copied. S404, the abnormal memory is replaced with a new memory after the abnormal memory is powered off. S405, a power on key of the new memory is triggered. S406, the new memory is powered on and initialized in response to the triggering operation of the power on key of the new memory. S407, after initialization, the new memory is added to the memory mapping table of the system, so that the new memory can work normally.

Figure 5:
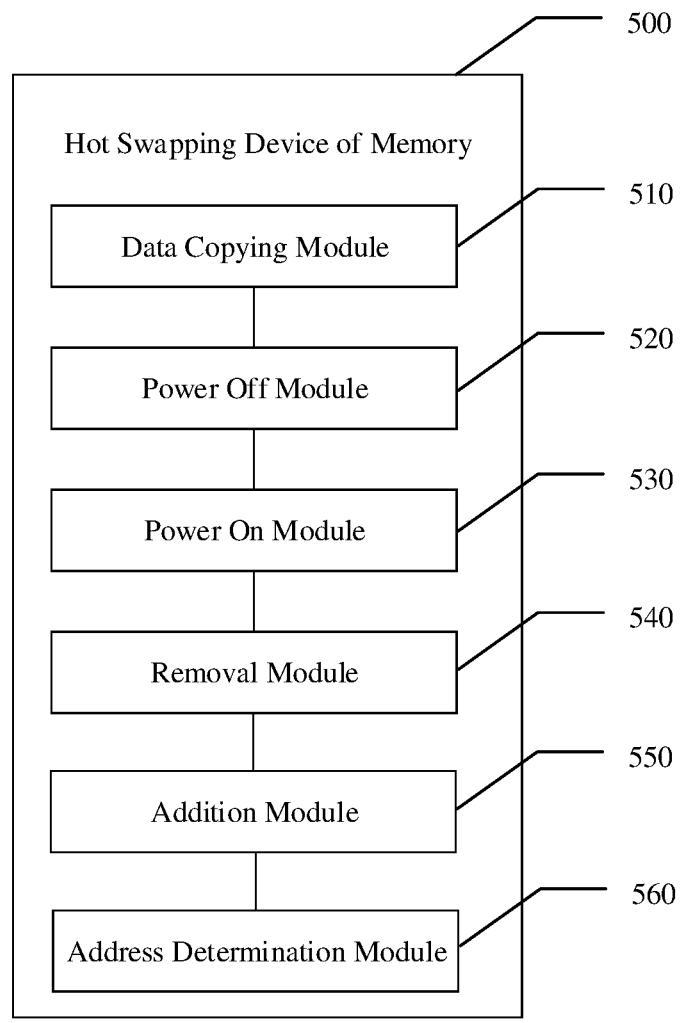
FIG. 5 schematically shows a block diagram of a device for hot swapping a memory according to an exemplary implementation mode of the disclosure.

In addition, the exemplary implementation mode of the disclosure further provides a device for hot swapping a memory. Referring to FIG. 5, the hot swapping device 500 of a memory includes: a data copying module 510, a power off module 520, a power on module 530, a removal module 540, an addition module 550, and an address determination module 560.

The data copying module 510 may be configured to, in response to a triggering operation of a replacement key of the abnormal memory, copy data on an abnormal memory to an idle memory, when a system is powered on.

The power off module 520 may be configured to power off the abnormal memory and replace the abnormal memory with a new memory after the data is copied.

The power on module 530 may be configured to, in response to a triggering operation of a power on key of the new memory, power on the new memory.

In an exemplary implementation mode of the disclosure, the power off module 520 may be configured to pull down a power management IC enable signal corresponding to the abnormal memory to power off the abnormal memory.

In an exemplary implementation mode of the disclosure, the removal module 540 may be configured to remove the abnormal memory from a memory mapping table of the system.

In an exemplary implementation mode of the disclosure, the addition module 550 may be configured to add the new memory to the memory mapping table of the system.

In an exemplary implementation mode of the disclosure, the address determination module 560 may be configured to determine a physical address of the abnormal memory according to a logical address of abnormal data.

In an exemplary implementation mode of the disclosure, the data copying module 510 may be configured to stop a writing operation on the abnormal memory, store the data in the abnormal memory in a cache through a reading operation, and write the data in the cache into the idle memory.

In an exemplary implementation mode of the disclosure, the power on module 530 may be configured to pull up a power management IC enable signal corresponding to the new memory to power on the new memory.

Specific details of various modules in the abovementioned hot swapping device of a memory have been described in detail in the corresponding method for hot swapping a memory, which will not be elaborated herein.

Figure 6:
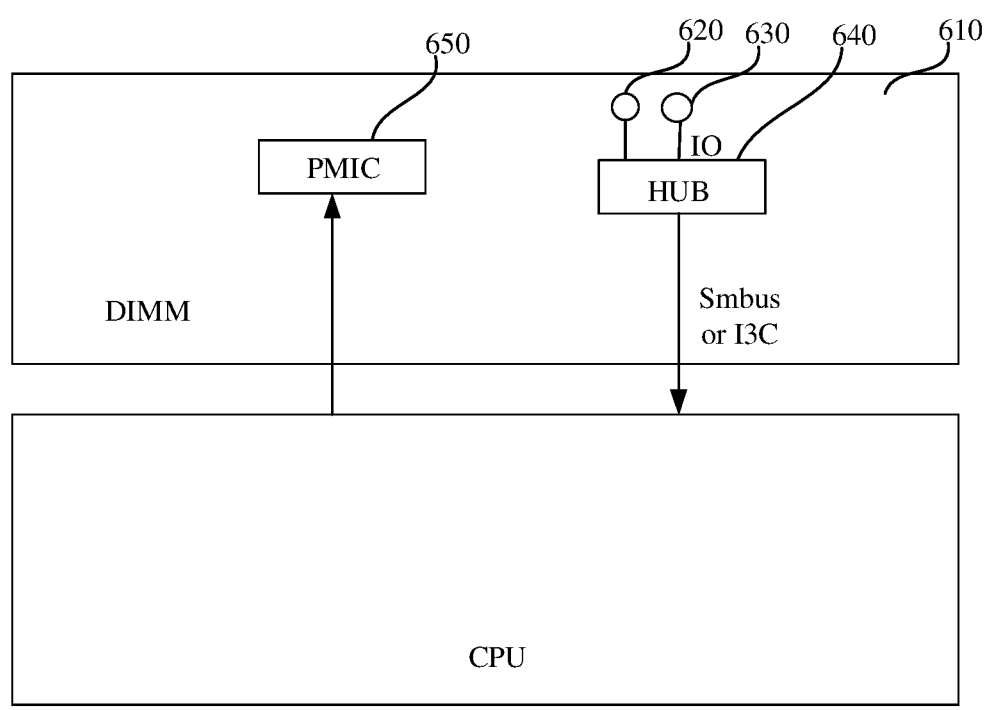
FIG. 6 schematically shows a schematic structural diagram I of a memory according to an exemplary implementation mode of the disclosure.

Further, in order to implement the abovementioned method for hot swapping the memory, an exemplary implementation mode of the disclosure further provides a memory capable of applying the method for hot swapping a memory. Referring to FIG. 6, the memory includes: a memory body 610, a replacement key 620 and a power on key 630 arranged on the memory body 610.

The replacement key 620 and the power on key 630 are separately connected to a hub HUB640 through an input/output interface IO. The hub 640 may be configured to send a system management bus signal to a CPU when level conversion occurs at the input/output interface IO. That is to say, the hub 640 needs to be connected with the CPU. The CPU may be an element independent from the memory in the system.

The memory needs to be connected to the CPU through the hub 640, so as to power on or power off the memory through the CPU. That is, the CPU can power on or power off the memory after receiving the system management bus signal.

In actual applications, the input/output interface IO connected to the replacement key 620 and the power on key 630 may be different pins of the same IO IC. One pin is connected to the replacement key 620 and the other pin is connected to the power on key 630.

In an exemplary implementation mode of the disclosure, the system management bus signal may include the Smbus or I3C signal described in the foregoing embodiments.

In an exemplary implementation mode of the disclosure, the level conversion of the input/output interface IO may be that the level at the input/output interface IO is converted from a high level to a low level when the replacement key 620 is triggered; or the level at the input/output interface IO is converted from a low level to a high level when the replacement key 620 is triggered.

In addition, the level conversion of the input/output interface IO may also be that the level at the input/output interface IO is converted from a high level to a low level when the power on key 630 is triggered; or the level at the input/output interface IO is converted from a low level to a high level when the power on key 630 is triggered.

Figure 7:
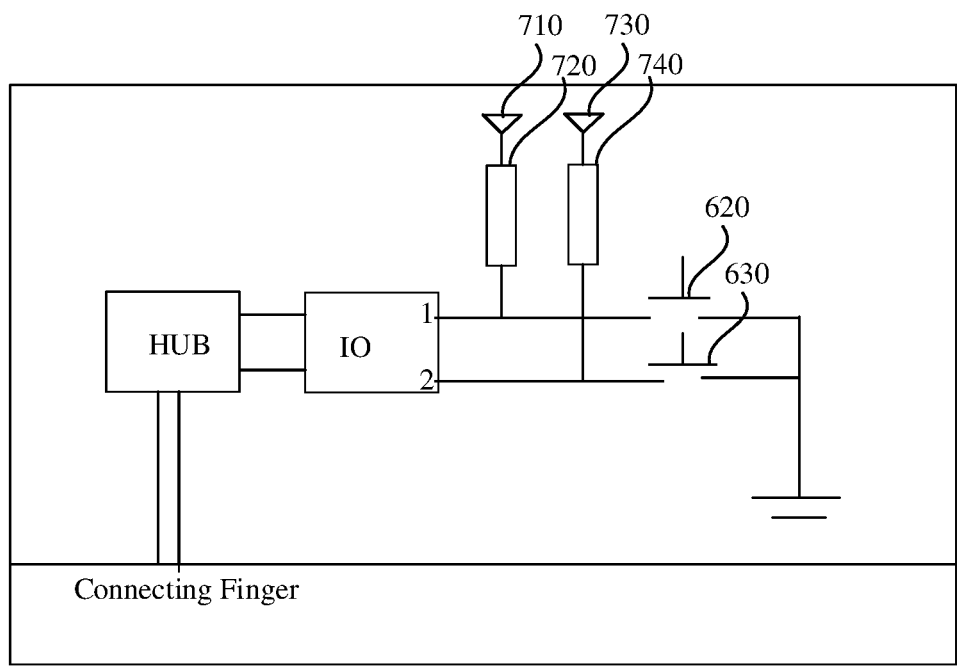
FIG. 7 schematically shows a schematic structural diagram II of a memory according to an exemplary implementation mode of the disclosure.

In order to realize the level conversion at the input/output interface IO, referring to FIG. 7, the memory may further include a first power supply 710 and a first resistor 720. The input/output interface IO is grounded through the replacement key 620, and the first power supply 710 is arranged on a connecting line between the input/output interface IO and the replacement key 620 to provide a high level for the input/output interface IO. The first resistor 720 is also arranged on the connecting line of the first power supply 710, and the first resistor 720 can achieve an effect of stabilizing the voltage. The resistance of the first resistor 720 may be set according to actual situations. There are no special limits made thereto in the exemplary implementation mode of the disclosure.

In an exemplary implementation mode of the disclosure, after the replacement key 620 is pressed down, the input/output interface IO is communicated with a ground terminal, so that the level at the input/output interface IO will be converted from a high level to a low level. As shown in FIG. 7, the input/output interface IO here may be a first pin 1 of an IO chip.

In actual applications, the replacement key 620 may be a switch, and the input/output interface IO and the ground terminal may be conducted when the replacement key 620 is pressed down.

In an exemplary implementation mode of the disclosure, continuing to refer to FIG. 7, the memory may further include a second power supply 730 and a second resistor 740. The input/output interface IO is grounded through the power on key 630, and the second power supply 730 is arranged on a connecting line between the input/output interface IO and the power on key 630 to provide a high level for the input/output interface IO The second resistor 740 is also arranged on the connecting line of the second power supply 730, and the second resistor 740 can achieve an effect of stabilizing the voltage. The resistance of the second resistor 740 may be set according to actual situations. There are no special limits made thereto in the exemplary implementation mode of the disclosure.

In an exemplary implementation mode of the disclosure, after the power on key 630 is pressed down, the input/output interface IO is communicated with a ground terminal, so that the level at the input/output interface IO will be converted from a high level to a low level. As shown in FIG. 7, the input/output interface IO here may be a second pin 2 of an IO chip.

In actual applications, the power on key 630 may be a switch, and the input/output interface IO and the ground terminal may be conducted when the power on key 630 is pressed down.

Figure 8:
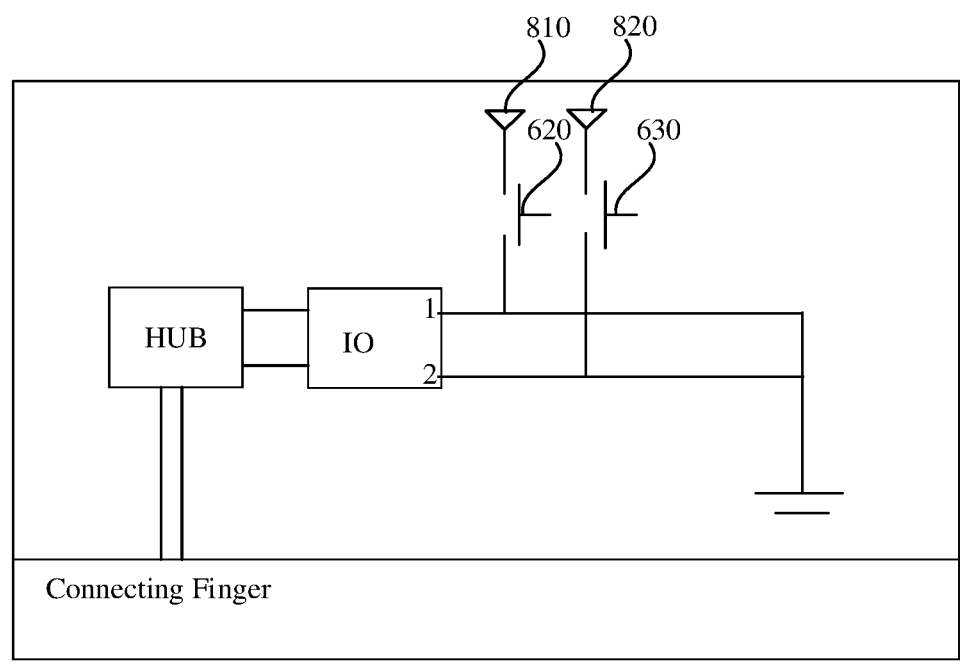
FIG. 8 schematically shows a schematic structural diagram III of a memory according to an exemplary implementation mode of the disclosure.

An exemplary implementation mode of the disclosure further provides an alternative method for realizing level conversion at an input/output interface IO Referring to FIG. 8, the memory may further include a third power supply 810. In the memory, the input/output interface IO is directly grounded to provide a low level for the input/output interface IO In addition, the replacement key 620 is arranged between the third power supply 810 and the input/output interface IO When the replacement key 620 is pressed down or triggered, the third power supply 810 will be conducted with the input/output interface IO, so that the level at the input/output interface IO is converted from a low level to a high level. As shown in FIG. 8, the input/output interface IO here may be a first pin 1 of an IO chip.

In practical application, a resistor may or may not be arranged beside the third power supply 810. There are no special limits made thereto in the exemplary implementation mode of the disclosure. The resistance of the resistor may also be set according to actual situations. There are no limits made thereto herein.

In an exemplary implementation mode of the disclosure, the replacement key 620 may be a switch, and the third power supply 810 and the input/output interface IO may be conducted when the replacement key 620 is pressed down.

In an exemplary implementation mode of the disclosure, continuing to refer to FIG. 8, the memory may further include a fourth power supply 820. In the memory, since the input/output interface IO is directly grounded, the level at the input/output interface IO is a low level at first. In addition, the power on key 630 is arranged between the fourth power supply 820 and the input/output interface IO. When the power on key 630 in pressed down or triggered, the fourth power supply 820 will be conducted with the input/output interface IO, so that the level at the input/output interface IO is converted from a low level to a high level. As shown in FIG. 8, the input/output interface IO here may be a second pin 2 of an IO chip.

In an exemplary implementation mode of the disclosure, the abovementioned power on key 630 may be a switch, and the fourth power supply 820 and the input/output interface IO may be conducted when the power on key 630 is pressed down.

In an exemplary implementation mode of the disclosure, in order to power on or off the memory through the CPU, as shown in FIG. 6, the CPU also needs to be connected to the power management IC PMIC650 of the memory. The CPU can control the memory to be powered off by pulling down the power management IC enable signal; and the CPU can control the memory to be powered on by pulling up the power management IC enable signal.

In an exemplary implementation mode of the disclosure, as shown in FIG. 7 and FIG. 8, the input/output interface IO is connected to a connecting finger of the memory through a hub. The hub is connected to the CPU by the connecting finger through the wiring on the mainboard, so as to realize the transmission of signals.

The memory provided by the embodiments of the disclosure may be switched between the power supply and the ground terminal by connecting the input/output interface with the power supply or the ground terminal, thereby realizing the level conversion at the input/output interface. When the level conversion occurs at the input/output interface, the hub can send the system management bus signal to the CPU, and the CPU can power on or power off the memory, so as to realize the power off replacement of the abnormal memory and the power on of the newly replaced memory. That is, the memory can be used in the hot swapping process of the memory described in the abovementioned embodiments.

Figure 9:
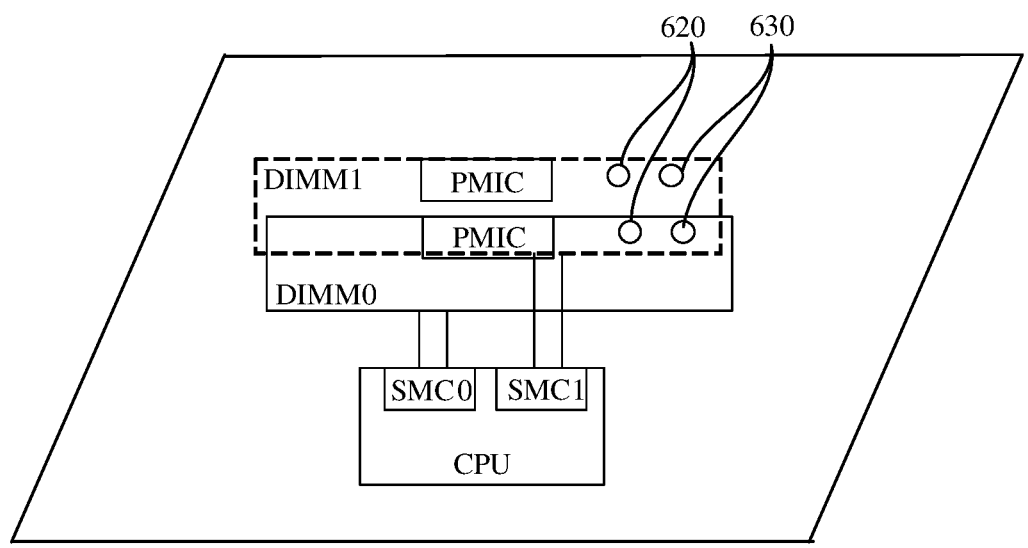
FIG. 9 schematically shows a schematic structural diagram of a mainboard for inserting the abovementioned memory according to an exemplary implementation mode of the disclosure.

Referring to FIG. 9, a mainboard for inserting the abovementioned memory is provided. On the mainboard as shown in FIG. 9, the power supply PMIC of each memory has been disposed on the memory other than the mainboard. Such as DDR5 DIMM, each DIMM has an independent PMIC, so that each DIMM can be powered on and off independently.

In addition, a sub memory controller (SMC) of each channel of the CPU is also independent, and one SMC controls one DIMM. For example, as shown in FIG. 9, SMC0 on the CPU controls DIMM0, and SMC1 controls DIMM1. When DIMM0 is replaced, it only needs to be controlled by SMC0. When DIMM1 is replaced, it only needs to be controlled by SMC1.

Therefore, when one of the memories is abnormal and needs to be replaced, only this memory needs to be powered off, which will not affect the normal use of other memories, and the CPU can work normally. Similarly, the newly replaced memory can also be powered on directly without affecting other memories and CPU, thus providing a basis for hot swapping memories.

The abovementioned embodiments may be completely or partially implemented through software, hardware, firmware, or any combination thereof. When software is used to implement the embodiments, the embodiments may be implemented completely or partially in a form of a computer program product. The computer program product includes one or more computer commands. When the computer program commands are loaded and executed on a computer, the processes or functions according to the embodiments of the disclosure are generated completely or partially. The computer may be a universal computer, a dedicated computer, a computer network, or other programmable apparatuses. The computer commands may be stored in a computer readable storage medium, or may be transmitted from one computer readable storage medium to another. The computer readable storage medium may be any available medium accessible to a computer, or a data storage device, such as a server or a data center, integrating one or more available media. The available medium may be a magnetic medium (such as floppy disk, hard disk, and magnetic tape), an optical medium (such as a DVD), or a semiconductor medium (such as a solid state disk (SSD)). In the embodiments of the disclosure, the computer may include the apparatuses described above.

Although the disclosure is described with reference to various embodiments here, in a process of implementing the disclosure that claims protection, those skilled in the art may understand and implement other variations of the disclosed embodiments by viewing the accompanying drawings, disclosed content, and the accompanying claims. In claims, "comprising" does not exclude another component or another step, and "a" or "one" does not exclude the case of plurality. A single processor or other units may implement several functions enumerated in the claims. Some measures are described in dependent claims that are different from each other, but this does not mean that these measures cannot be combined to produce a better effect.

Although the disclosure is described with reference to specific features and the embodiments thereof, apparently, various modifications and combinations may be made to them without departing from the spirit and scope of the disclosure. Correspondingly, the specification and accompanying drawings are merely exemplary descriptions of the disclosure defined by the accompanying claims, and are considered as any or all modifications, variations, combinations or equivalents that cover the scope of the disclosure. Apparently, those skilled in the art can make various modifications and variations to the disclosure without departing from the spirit and scope of the disclosure. The disclosure is also intended to cover these modifications and variations provided that they fall within the scope of protection defined by the claims and their equivalent technologies of the disclosure.

The invention claimed is:

1. A memory, comprising
a memory body, and a replacement key and a power on key arranged on the memory body, wherein
the replacement key and the power on key are separately connected to a hub through an input/output interface; and the hub is configured to send a system management bus signal to a central processing unit (CPU) when level conversion occurs at the input/output interface; and
the CPU is configured to power on or power off the memory after receiving the system management bus signal.

2. The memory of claim 1, further comprising
a first power supply and a first resistor, wherein
the input/output interface is grounded through the replacement key; the first power supply is arranged on a connecting line between the input/output interface and the replacement key; and the first resistor is arranged on a connecting line of the first power supply.

3. The memory of claim 1, further comprising
a second power supply and a second resistor, wherein
the input/output interface is grounded through the power on key; the second power supply is arranged on the connecting line between the input/output interface and the power on key; and the second resistor is arranged on a connecting line of the second power supply.

4. The memory of claim 1, further comprising
a third power supply, wherein
the input/output interface is grounded; and the replacement key is arranged between the third power supply and the input/output interface.

5. The memory of claim 1, further comprising
a fourth power supply, wherein
the input/output interface is grounded; and the power on key is arranged between the fourth power supply and the input/output interface.

6. The memory of claim 1, wherein
both the power on key and the replacement key are switches.

7. The memory of claim 1, wherein
the CPU is connected to the power management IC of the memory; the CPU controls the memory to be powered off by pulling down the power management IC enable signal; and
the CPU controls the memory to be powered on by pulling up the power management IC enable signal.

* * * * *